United States Patent [19]

Ishizuka et al.

[11] 4,381,210
[45] Apr. 26, 1983

[54] PROCESS FOR PRODUCING POLYIMIDE TUBES

[75] Inventors: Takashi Ishizuka; Yasuhiro Moriyama; Masao Nakamura, all of Ibaraki, Japan

[73] Assignee: Nitto Electric Industrial Co., Ltd., Osaka, Japan

[21] Appl. No.: 238,270

[22] Filed: Feb. 25, 1981

[30] Foreign Application Priority Data

Feb. 25, 1980 [JP] Japan .................................. 55/23017

[51] Int. Cl.³ .......................... B65H 81/00; C09J 5/00
[52] U.S. Cl. .................................. 156/195; 156/218; 156/308.6; 156/330.9; 427/208.2
[58] Field of Search .................. 156/86, 187, 307.3, 156/307.5, 307.6, 331.1, 331.8, 143, 144, 149, 156/162, 195, 215, 218, 330.9, 272, 308.6, 184, 156/208, 301; 428/473.5, 474.4; 252/511; 260/32.6 N, 31.2 N; 528/322; 427/208.2

[56] References Cited

U.S. PATENT DOCUMENTS 3,762,982 10/1973 Whittington ........................ 156/187
3,996,203 12/1976 Hand et al. ........................ 528/322

FOREIGN PATENT DOCUMENTS 47-43097 12/1972 Japan .
49-77346 7/1974 Japan .

Primary Examiner—Edward C. Kimlin
Assistant Examiner—L. Falasco

Attorney, Agent, or Firm—Sughrue, Mion, Zinn, Macpeak & Seas

[57] ABSTRACT

A process for producing a polyimide tube which comprises applying a solution of polyamide acid obtained by reacting a biphenyltetracarboxylic acid dianhydride represented by the general formula

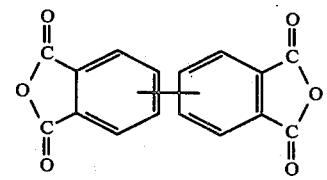

with an aromatic diamine in an organic polar solvent to at least one surface of a polyimide film, drying thereafter the film with heating to convert a part of the polyamide acid into the imide form while controlling the volatile material content to about 5 to 60% by weight, by which a compound film having a heat-fusible layer composed of a polyimide precursor is obtained, winding the compound film on a heat resistant core material, heating to unify the compound film by the heat-fusible layer, and removing the heat resistant core material to obtain the polyimide tube.

7 Claims, No Drawings

PROCESS FOR PRODUCING POLYIMIDE TUBES

FIELD OF THE INVENTION

The present invention relates to a process for producing polyimide tubes.

BACKGROUND OF THE INVENTION

Hitherto, electrically insulating tapes obtained by coating a tack adhesive on one surface of a polyethylene film or a polyvinyl chloride film and cutting such into a suitable width have been used as electrically insulating materials for coating electrical wires or splicing cables, etc.

These electrically insulating tapes are wound on an object to be coated. However, winding on the object to be coated cannot be always easily carried out, and there is a disadvantage that unevenness easily occurs on the insulating property of the coated parts due to differences in the skill of workers.

In order to minimize this disadvantage of electrically insulating tapes, electrically insulating tubes which do not require the tube to be wound when such is applied to the object to be coated, such as a polyethylene tube or a polyvinyl chloride tube, etc., have been used.

Recently, improvement of various types of properties including the heat resistance of the electrically insulating materials has been further required. However, this requirement cannot often be met with the above-described polyethylene tube or polyvinyl chloride tube.

Hence, polyimide resins have been of interest as electrically insulating materials satisfying the above-described requirement. However, a tube molding process involving extrusion molding which is used for other thermoplastic resins cannot be utilized for the polyimide resins because polyimide resins have a high melt viscosity and poor fluidity.

Further, since polyimide resins themselves do not have heat-fusible properties, it is not possible to utilize a process which comprises winding the film on a core material and thermally fusing such to make a tube.

Nevertheless, polyimide resins have extremely excellent properties including heat resistance as compared with polyethylene or polyvinyl chloride, but they cannot be widely used for industrial production of tubes because of difficulty in molding.

SUMMARY OF THE INVENTION

An object of the present invention is to provide tubes which sufficiently exhibit the inherent excellent heat resistance of polyimide resin.

Specifically, this invention provides a process for producing polyimide tubes comprising applying a solution of polyamide acid obtained by reacting a biphenyltetracarboxylic acid dianhydride represented by the general formula

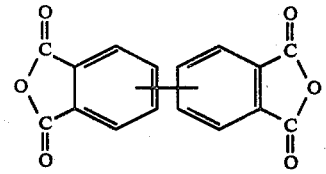

(herein referred to as BPDA) with an aromatic diamine in an organic polar solvent to at least one surface of a polyimide film, drying thereafter the coated film with heating to convert a part of the polyamide acid into an amide form while maintaining the volatile material content at about 5 to about 50% by weight, by which a compound film having a heat-fusible layer composed of a polyimide precursor is obtained, winding the compound film on a heat resistant core material, heating to unify the compound film using the heat-fusible layer, and removing the heat resistant core material.

DETAILED DESCRIPTION OF THE INVENTION

In the present invention, the solution of polyamide acid as component for forming the heat-fusible layer is first applied to one surface or both surfaces of a polyimide film as a base.

The solution of polyamide acid is obtained by reacting BPDA represented by the above-described general formula, for example, 3,4,3',4'-BPDA, 2,3,3',4'-BPDA or 2,3,2',3'-BPDA, with an aromatic diamine, for example, m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenylsulfone, 3,3'-diaminodiphenylsulfone, 1,5-diaminonaphthalene, 2,6-diaminonaphthalene or 3,4'-diaminobenzanilide in an organic polar solvent. Suitable organic polar solvents which can be used include N,N-dialkylcarboxyamides such as N,N-dimethylformamide, N,N-diethylformamide, N,N-dimethylacetamide, N,N-diethylacetamide or N,N-dimethylmethoxyacetamide, etc., dimethyl sulfoxide, N-methyl-2-pyrrolidone, dimethylsulfone and hexamethylphosphoramide, etc.

On obtaining the solution of polyamide acid by reacting the above-described BPDA with the aromatic diamine, although the concentration of components in the organic polar solvent may be suitably varied depending on various factors, generally a concentration of about 5 to about 30% by weight and, preferably, 10 to 25% by weight. Further, a suitable reaction temperature is generally about 80° C. or less and, preferably, 5° to 50° C., and the reaction time is generally about 1 to about 10 hours or so.

In addition, the BPDA, the aromatic diamine and the organic polar solvent may be used alone, respectively, or may be used as a mixture of two or more kinds thereof, respectively. Further, solvents including aromatic hydrocarbons such as benzene, toluene or xylene, etc., ethers such as dioxane, etc., ketones such as methyl ethyl ketone, etc., alcohols such as methanol or ethanol, etc., or phenols such as phenol or cresol, etc., can be used together with the organic polar solvent.

When the BPDA reacts with the aromatic diamine in the organic polar solvent, polyamide acid is formed and the viscosity of the solution increases as the reaction proceeds. In the present invention, it is preferred to obtain a solution of polyamide acid having an inherent viscosity of about 0.5 or more. A heat-fusible layer formed on the polyamide film using the solution of polyamide acid having an inherent viscosity of about 0.5 or more has particularly high bonding strength to the polyimide film and excellent elasticity. Accordingly, the compound film having such a heat-fusible layer has a characteristic that the compound film can be easily wound on a heat resistant core material of a small diameter, because the possibility of cracking of the heat-fusible layer or a separation of the heat-fusible layer from the polyimide film as the base does not occur when the shape of the film is changed into a roll form by the winding operation on the heat resistant core material.

The inherent viscosity of the solution of polyamide acid used in the present invention is a calculated value which is obtained with the following formula (I) after measurement of the viscosity of a solution obtained by dissolving polyamide acid removed from the solution of polyamide acid in a prescribed solvent.

$$\text{Inherent Viscosity} = \frac{\text{Natural Logarithm (log e)} \frac{\text{Viscosity of Solution}}{\text{Viscosity of Solvent}}}{C} \quad (I)$$

where C in the above-described formula (I) is number of grams of polyamide acid in 100 ml of the solution.

The resulting solution of polyamide acid is viscous, the viscosity of which, measured with a B type viscometer at 30° C., is generally about 10 to $10^8$ poises when the concentration of the polyamide acid is 5 to 30% by weight.

In the present invention, the above-described solution of polyamide acid is applied to the desired surface of the polyimide film. Various coating methods can be utilized for application. Examples of such methods include (a) a method which comprises immersing the polyimide film in the solution of polyamide acid, removing the film and squeezing off excess amount of polyamide acid with a doctor knife, (b) a method which comprises applying the solution of polyamide acid to a surface of the polyimide film by transfer using a reverse roll coater, and (c) a method which comprises applying the solution of polyamide acid to a surface of the polyimide film by extrusion using a T die.

In the above-described coating step, the solution of polyamide acid may be applied directly to the surface of the polyimide film. But the solution can be applied after the viscosity thereof was controlled by dilution with a suitable solvent or by heating the solution.

The polyimide film used as the base of the compound films in the present invention can be obtained by a process which comprises reacting an aromatic tetracarboxylic acid dianhydride, for example, pyromellitic acid dianhydride, 3,3',4,4'-benzophenonetetracarboxylic acid dianhydride, 3,3',4,4'-diphenyl ether tetracarboxylic acid dianhydride, 3,3',4,4'-diphenylpropanetetracarboxylic acid dianhydride or BPDA with an aromatic diamine in an organic polar solvent to prepare a solution of polyamide acid, forming a film by flow molding the resulted solution of polyamide acid, and heating to substantially remove the solvent simultaneously with the conversion of the polyamide acid into imide. The thickness of the film can vary depending on the thickness of tubes to be produced or the number of times the compound film is wound on the heat resistant core material, etc., and the thickness is generally about 5 to 250μ or so.

The polyimide film to which the solution of polyamide acid was applied in the above-described manner is then dried with heating. The drying with heating is carried out in order to convert a part of polyamide acid in the solution applied to the surface of the polyimide film into the imide form simultaneously with controlling the volatile material content at about 5 to about 50% by weight, by which a heat-fusible layer composed of a polyimide precursor as a main component is formed. The heating temperature, which may be varied according to various conditions, is generally about 50° to 200° C. and preferably 80° to 150° C.

The heat-fusible layer formed on the prescribed surface of the polyamide film by drying with heating contains the so-called polyimide precursor wherein a part of the polyamide acid is converted into the imide form, as a main component, and about 5 to about 50% by weight of volatile materials such as a part of the organic polar solvent used for the reaction of BPDA with the aromatic diamine or water formed upon ring closure of the polyamide acid into the imide form.

In the present invention, if the volatile material content of the heat-fusible layer composed of the polyimide precursor as a main component is less than about 5% by weight, the bonding strength of the compound film on heating after the film is wound on the heat resistant core material is poor and the mutual adhesion of the compound film is insufficient. If the volatile content is more than 50% by weight, foaming occurs during heat fusion or the heat-fusible layer deteriorates during storage because moisture in the air is absorbed.

The volatile material content of the above-described heat-fusible layer is a value calculated using the following formula (II).

$$\text{Volatile Material Content} = \frac{W - Wd}{W - Wb} \times 100 \quad (II)$$
$$(\% \text{ by weight})$$

where, in the above described formula (II), W is the weight of the compound film before drying, Wd is the weight of the compound film after drying with heating at 350° C. for 2 hours, and Wb is the weight of the polyimide film as the base film.

Further the thickness of the heat-fusible layer may be varied depending on the purpose but the thickness is generally about 5 to 250μ or so.

In the step of drying with heat, it is very necessary for the volatile material content of the heat-fusible layer formed on the polyimide film to be controlled to within the above-described range. With respect to imide conversion ratio, the close attention, as required for the volatile material content, is not necessary for attaining the objects of this invention. The imide conversion ratio can be obtained by calculating, for example, the ratio of light absorbance at 1770 cm$^{-1}$ in the infrared absorption spectrum due to absorption of the imide group to light absorbance at 1720 cm$^{-1}$ due to absorption of the amide acid group.

The compound film obtained through the step of applying polyamide acid and the step for drying with heating is then wound on a heat resistant core material immediately or after cutting the compound into a desired width, by spirally rolling or simply rolling the film onto the heat resistant core material so as to have a desired thickness comprising at least one layer of the compound film.

Any material can be used as the heat resistant core material used in this case if the shape thereof does not deform by heating for unifying the core material the compound film wound thereon. For example, rods and pipes of a heat resistant synthetic resin such as fluorine containing resin or silicone resin, etc., or metal, etc., can be suitably used. The synthetic resin and metal are preferably heat-resistant to temperatures of about 180° C. or higher. The specific examples of the fluorine containing resin are polytetrafluoroethylene, hexafluoropropylene, etc., and the specific examples of the silicone resin are polydimethylsiloxane, etc.

Where a material, which does not have suitable release properties, such as metal, is used as the heat resistant core material, a release resin such as a fluorine containing resin or a silicone resin can be applied to the outer surface of the core material or a fluorine containing resin sheet, a silicone resin sheet or a fusible sheet with a fusible layer on the release resin sheet is first wound on the core material and the compound film is then wound thereon.

In winding the compound film on the heat resistant core material as in the present invention, undesirable loosening of the wound compound film can be effectively prevented, if a metal foil, a heat resistant sheet such as a fluorine containing resin sheet, etc., or a fusible sheet with the heat resistant sheet as a base is wound on the outer surface of the compound film wound on the heat resistant core material to bind the compound film or the wound end of the compound film can be secured.

Further, as means for preventing loosening of the compound film wound on the heat resistant core material, it is possible to temporarily bond the wound end of the compound film with an adhesive or an adhesive tape.

In the present invention, the compound film wound on the heat resistant core material in the above-described manner is then heated to a temperature higher than the softening point of the heat-fusible layer. The heating is generally at temperatures of from about 150° to about 350° C. By heating, the heat-fusible adhesive layer softens to function as an adhesive layer, by which the compound film is unified to form a tube.

The softening point of the heat-fusible layer will vary depending on the imide conversion ratio of the imide precursor as the main component of the layer and the volatile material content, but the softening point is generally about 100° C. or more.

In this tube molding step, the imide conversion of the polyimide precursor as a heat-fusible layer forming component of the compound film is further advanced by heating. In the present invention, however, it is not always necessary to complete the imide conversion of the above-described precursor. Accordingly, the heating may be stopped in a stage when the bonding stength of the compound film becomes a value sufficient for practical use.

The final step in the process of the present invention is a step of removing the core material which comprises pulling out the heat-resistant core material in the polyimide tube molded in a body in the tube molding step.

This step for removing the core material may be carried out while such is still heated just after tube molding. However, the operation of removing the core material can be more easily carried out after cooling.

Films having heat-shrinking properties can be used as the polyimide film as the base of the compound film in the present invention. If a heat-shrinkable polyimide film is used, a heat-shrinkable tube can be obtained.

A heat-shrinkable polyimide film can be obtained by a process which comprises at least monoaxially stretching the polyimide film with heating and cooling while maintaining the film in a stretched condition.

The stretching ratio in this case preferably is in the range of about 1.05 to about 5 times with consideration being given to a practically effective heat-shrinking ratio and the working properties at stretching.

In the heat-shrinkable polyimide film obtained by stretching the polyimide film, the higher the stretching ratio is, the larger the heat-shrinking ratio is. In setting the stretching ratio at the above-described value, a film having a heat-shrinking ratio at a maximum of about 80% can be obtained.

When the relationship between the stretching ratio and the heat-shrinking ratio was examined, it has been confirmed that a heat-shrinking ratio at a maximum of about 50% was obtained where the stretching ratio was 2, a heat-shrinking ratio at a maximum of about 67% was obtained where the stretching ratio was 3, a heat-shrinking ratio at a maximum of about 75% was obtained where the stretching ratio was 4, and a heat-shrinking ratio at a maximum of about 80% was obtained where the stretching ratio was 5.

The above-described heat-shrinking ratio is the calculated value obtained using the following formula (III) after measurement which comprises printing two marks at a fixed interval (mark interval in this case is L) in the stretching direction on the heat-shrinkable polyimide film, heating the film at a prescribed temperature (higher than the stretching temperature) to cause heat-shrinking, cooling the film to room temperature, and measuring the interval of the mark ($L_o$).

$$\text{Heat-Shrinking Ratio (\%)} = \frac{L - L_o}{L} \times 100 \qquad (III)$$

Where a heat-shrinkable polyimide film is used as a compound film of the present invention, the step for applying the solution of polyamide, the step for drying with heating, the tube molding step and the step for removing the core material are carried out at a temperature lower than the heat-shrinking point of the heat-shrinkable polyimide film.

The polyimide tubes obtained as described above can be widely used not only as electrically insulating materials but also as heat-insulating materials and anti-corrosive materials.

According to the present invention, tube molding can be easily carried out, because a compound film having a heat-fusible layer on the prescribed surface of the polyimide film as the base is adhered with heating on the heat resistant core material.

Further, since the heat-fusible layer has a volatile material content about 5 to about 50% by weight, the possibility of foaming due to evaporation of volatile materials on heat fusion does not occur, and consequently, the heat-fusible strength of the compound film becomes large. Further, the heat-fusible layer does not deteriorate during storage of the compound films, because moisture in the air is not absorbed therein.

Moreover, when a heat-shrinkable polyimide film is used as the base of the compound film, it is possible to obtain heat-shrinkable polyimide tubes. A heat-shrinkable polyimide tube closely bonds to an object to be coated on shrinking when heated to a temperature higher than the stretching temperature of the heat-shrinkable polyimide film and, consequently, the bonding strength to the object to be coated increases.

The present invention is illustrated in greater detail by reference to the following examples. Unless otherwise indicated, all parts, percents, ratios and the like are by weight.

EXAMPLE 1

1,176 g (4 mols) of 3,4,3',4'-BPDA and 800 g (4 mols) of 4,4'-diaminodiphenyl ether were reacted in 14.5 kg of N-methyl-2-pyrrolidone at 5°–30° C. for 5 hours to prepare a solution of polyamide acid having a solution viscosity (value at 30° C. by a B type viscometer) of 2,700 poises and an inherent viscosity of 2.5.

Then, this solution of polyamide acid was applied to one surface of a long polyimide film (produced by Du Pont Co., trade name: Kapton H) having a width of 508 mm and a thickness of 50$\mu$ obtained from pyromellitic acid dianhydride and aromatic diamine using a knife coater and dried with heating for 15 minutes by passage through a drying furnace at 150° C. to obtain a long compound film having a heat-fusible layer with a volatile material content of 35% by weight and a thickness of 24$\mu$ formed on the entire surface.

Thereafter, this long compound film was cut in the longitudinal direction to a width of 20 mm. The film was wound on the outer surface of a silicone resin coated heat-resistant core rod of brass having a diameter of 10 mm by a half-wrapping method, and the wound end was temporarily bonded so that loosening was prevented.

The resulting product was then heated for 10 minutes in a drying furnace at 200° C. and further for 15 minutes in a drying furnace at 300° C. to form a tube by the mutual heat fusion of the compound film. After cooling to room temperature, the heat resistant core rod was removed by pulling the rod out to obtain a polyamide tube (A) having an inside diameter of 10 mm and a thickness of 0.13 mm.

In this polyimide tube (A), the compound film was firmly bonded by mutual heat fusion. When the middle part was cut and the cut section was examined with a magnifying glass, foaming was not observed in the part corresponding to the heat-fusible layer of the compound film.

In order to determine the hygroscopic property of the heat-fusible layer of the compound film, the compound film was stored for 1 month under an atmosphere of 25° C., 50% RH. Absorption of moisture was hardly observed and deterioration of the heat-fusible layer was not observed.

For comparison, a compound film having a heat-fusible layer with a volatile material content of 60% by weight and a thickness of 30$\mu$ was obtained using the same procedure as described above except that heating after application of the solution of polyamide acid was carried out at 120° C. for 12 minutes, and a polyimide tube (B) having the same size as described above was obtained using the same procedure as described above.

When the middle part of the polyimide tube (B) was cut and the cut section was examined in the same manner as described above, foaming was observed in the part corresponding to the heat-fusible layer of the compound film.

When the compound film used for producing the polyimide tube (B) was subjected to the same evaluation for moisture absorption as described above, the heat-fusible layer became cloudy and deteriorated due to absorption of moisture.

EXAMPLE 2

A compound film produced as described in Example 1 was cut in the longitudinal direction to a width of 250 mm. The film was wound on the outer surface of a silicone resin coated heat resistant core pipe of stainless steel having an outside diameter of 100 mm to obtain 2 layer wound product. The wound end was temporarily adhered so that loosening did not occur.

Thereafter, the same procedures as in Example 1 were carried out to obtain a polyimide tube (C) having an inside diameter of about 100 mm and a thickness of 0.13 mm.

In this polyimide tube (C), the compound film was firmly bonded by mutual heat fusion similar to the tube (A) in Example 1, and foaming in the part corresponding to the heat-fusible layer of the film was not observed.

EXAMPLE 3

644 g (2 mols) of 3,3',4,4'-benzophenonetetracarboxylic acid dianhydride and 400 g (2 mols) of 4,4'-diaminodiphenyl ether were reacted in 7.6 kg of N,N-dimethylacetamide at 5°–30° C. for 5 hours to prepare a solution of polyamide acid having a solution viscosity (value at 30° C. by a B type viscometer) of 1,200 poises and an inherent viscosity of 1.21.

Then, this solution of polyamide acid was processed by a flow molding process to produce a film, which was dried at 300° C. for 30 minutes to obtain a long polyimide film having a thickness of 25$\mu$ and a width of 300 mm.

Then, to one surface of this polyimide film, a solution of polyamide acid produced as in Example 1 was applied by extrusion using a T die and dried for 20 minutes by passage through a drying furnace at 170° C. to obtain a long compound film having a heat-fusible layer with a volatile material content of 12% by weight and a thickness of 20$\mu$.

Thereafter, this long compound film was cut in the longitudinal direction to a width of 20 mm. The film was wound on a heat resistant core rod of polytetrafluoroethylene having a diameter of 15 mm by a half-wrapping method and the wound end was temporarily bonded with an adhesive tape so that loosening did not occur.

The resulting product was then heated for 10 minutes in a drying furnace at 200° C. and further for 60 minutes in a drying furnace at 250° C. to form a tube by mutual adhesion of the wound compound film. After cooling to room temperature, the heat resistant core pipe was removed by pulling the pipe out to obtain a polyimide tube (D) having an inside diameter of about 15 mm and a thickness of 0.08 mm.

In this polyimide tube (D), the compound film was firmly bonded by mutual heat fusion. When the middle part of the tube was cut and the cut section was examined with a magnifying glass, foaming was not observed in the part corresponding to the heat-fusible layer of the compound film.

For comparison, a compound film having a heat-fusible layer with a volatile material content of 2% by weight and a thickness of 18$\mu$ was obtained using the same procedures as described above except that drying with heating after application of the solution of polyamide acid was carried out at 200° C. for 30 minutes, and polyimide tube (E) having the same size as described above was obtained using the same procedures as described above.

In this polyimide tube (E), however, the mutual heat fusion of the compound film was insufficient, and the superposed part of the compound film separated here and there when the tube was slightly bent.

EXAMPLE 4

A film was obtained by flow molding of a solution of polyamide acid produced as in Example 1 on a stainless endless belt having a width of 400 mm and a length of 20 m and drying for 20 minutes in a drying furnace at 150° C. The film was further dried for 15 minutes in a drying furnace heated to 250°–300° C. to obtain a long polyimide film having a thickness of 45μ and a width of 350 mm.

Then, this long polyimide film was placed in two pairs of pinch rolls disposed in a heating furnace kept at 250° C. at a prescribed interval. The rate of the pinch rolls in the drawing-out side was controlled to 0.5 m/min and the rate of the pinch rolls in the winding side was controlled to 1.0 m/min, by wich the film was stretched in the longitudinal direction at a stretching ratio of 2 to obtain a long heat-shrinkable polyimide film having a thickness of 32μ.

In order to evaluate the heat-shrinking ratio of the resulting heat-shrinkable polyimide film, the film was cut in the longitudinal direction to make a long strip having a width of 20 mm and a length of 200 mm, and two marks were printed at an interval of 100 mm. This test strip was allowed to stand in a drying furnace at 300° C. for 5 minutes, and the strip was then removed from the drying furnace and cooled to room temperature. When the interval between the marks was measured, it was found to be 50 mm which meant that the heat-shrinking ratio was 50% and the stretching was completely eliminated.

Then, to one surface of this heat-shrinkable polyimide film, the solution of polyamide acid produced as in Example 1 was applied by extrusion using a T die and dried for 20 minutes by passage through a drying furnace at 160° C. to obtain a compound film having a heat-fusible layer with a volatile material content of 18% by weight and a thickness of 25μ.

This compound film was then cut in the longitudinal direction to a width of 20 mm. The film was wound on the same type of heat resistant core material as described in Example 1 using a half-wrapping method and the wound end was temporarily bonded with an adhesive tape so that loosening did not occur.

Thereafter, it was heated for 20 minutes in a drying furnace at 200° C. to form a tube by mutual heat fusion of the compound film. After cooling to room temperature, the heat resistant core material was removed by pulling the core material out to obtain a heat-shrinkable polyimide tuve (F) having an inside diameter of about 10 mm and a thickness of 0.10 mm.

In this heat-shrinkable polyimide tube (F), the compound film was firmly bonded by mutual heat fusion. When the middle part was cut and the cut section was examined with a magnifying glass, foaming was not observed in the part corresponding to the heat-fusible layer of the compound film.

When a copper wire having a diameter of 8 mm was covered with this heat-shrinkable polyimide tube (F) and subjected to heat-shrinking by heating at 300° C. for 10 minutes, the tube firmly bonded to the copper wire.

EXAMPLE 5

1,176 g (4 mols) of 3,4,3',4'-BPDA and 800 g (4 mols) of 4,4'-diaminodiphenyl ether were reacted in 17.8 kg of N-methyl-2-pyrrolidone at 5°–30° C. for 6 hours to obtain a solution of polyamide acid having a solution viscosity (value at 30° C. by a B-type viscometer) of 15,200 poises and an inherent viscosity of 3.5.

After this solution of polyamide acid was heated to 45° C. to control the viscosity, a film having a volatile material content of 27% by weight was produced by flowing the solution onto the same type of endless belt as that described in Example 4 and drying for 20 minutes in a drying furnace at 150° C. The film was further dried for 15 minutes in a heating furnace at 250°–300° C. to obtain a long polyimide film having a width of 350 mm and a thickness of 51μ.

Thereafter, this long polyimide film was stretched using a stretching apparatus as described in Example 4 under the condition of a temperature of 250° C., a rate of 0.5 m/min for the pinch rolls in the drawing-out side and a rate of 1.5 m/min for the pinch rolls in the winding side to obtain a stretching ratio of 3 to produce a long heat-shrinkable polyimide film having a thickness of 26μ.

When the heat-shrinking ratio of this heat-shrinkable polyimide film was measured in the same manner as in Example 4, the ratio was found to be 67% which meant that stretching was completely eliminated.

On the other hand, 1,176 g (4 mols) of 2,3,3',4-BPDA, 640 g (3.2 mols) of 4,4'-diaminodiphenyl ether and 86.4 g (0.8 mol) of m-phenylenediamine were reacted in 10.8 Kg of N-N-dimethylformamide at 5°–30° C. for 5 hours to obtain a solution of polyamide acid having a solution viscosity (value at 30° C. by a B-type viscometer) of 3,200 poises and an inherent viscosity of 1.2.

Then, this solution of polyamide acid was applied to one surface of the above-described heat-shrinkable polyimide film and dried in the same manner as in Example 4 to obtain a compound film having a heat-fusible layer with a volatile material content of 15.5% by weight and a thickness of 30μ.

This compound film was then cut in the longitudinal direction to a width of 250 mm. The film was wound on the outer surface of a silicone resin coated heat resistant core pipe of stainless steel of an outside diameter of 30 mm to form a 3 layer wound product, and the wound end was temporarily bonded with an adhesive tape so that loosening did not occur.

Thereafter, it was heated for 10 minutes in a drying furnace at 200° C. to form a tube by mutual heat fusion of the compound film. After cooling to room temperature, the heat resistant core pipe was removed by pulling the pipe out to obtain a heat-shrinkable polyimide tube (G) having an inside diameter of 30 mm and a thickness of 0.15 mm.

In this heat-shrinkable polyimide tube (G), the compound film was firmly bonded by heat fusion. When the middle part thereof was cut and the cut section was examined with a magnifying glass, foaming was not observed in the part corresponding to the heat-fusible layer of the compound film.

When an iron pipe having an outside diameter of 25 mm was covered with this heat-shrinkable polyimide tube (G) and subjected to heat-shrinking by heating at 350° C. for 10 minutes, the tube firmly bonded to the iron pipe.

While the invention has been described in detail and with reference to specific embodiments thereof, it will be apparent to one skilled in the art that various changes and modifications can be made therein without departing from the spirit and scope thereof.

What is claimed is:

1. A process for producing a polyimide tube which comprises applying a solution of polyamide acid obtained by reacting a biphenyltetracarboxylic acid dianhydride represented by the general formula

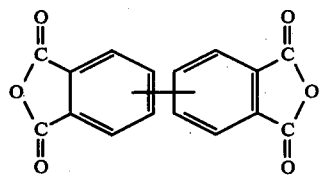

with an aromatic diamine in an organic polar solvent to at least one surface of a polyimide film, drying thereafter the film with heating to convert a part of said polyamide acid into the imide form while controlling the volatile material content to about 5 to 50% by weight, by which a compound film having a heat-fusible layer composed of a polyimide precursor is obtained, winding said compound film on a heat resistant core material, heating to unify the compound film by said heat-fusible layer, and removing the heat resistant core material to obtain said polyimide tube.

2. The process for producing a polyimide tube according to claim 1, wherein said polyimide film is a heat-shrinkable polyimide film.

3. The process for producing a polyimide tube according to claim 1, wherein said biphenyltetracarboxylic acid dianhydride is 3,4,3',4'-biphenyltetracarboxylic acid dianhydride, 2,3,3',4'-biphenyltetracarboxylic acid dianhydride, or 2,3,2',3'-biphenyltetracarboxylic acid dianhydride and wherein said aromatic diamine is m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenylsulfone, 3,3'-diaminodiphenylsulfone, 1,5-diaminonaphthalene, 2,6-diaminonaphthalene or 3,4-diaminobenzanilide.

4. The process for producing a polyimide tube according to claim 1, wherein said solution of polyamide acid has an inherent viscosity of about 0.5 or more.

5. The process for producing a polyimide tube according to claim 1, wherein said polyimide film is a film produced from a polyimide obtained on reacting an aromatic tetracarboxylic acid dianhydride with an aromatic diamine in an organic polar solvent.

6. The process for producing a polyimide tube according to claim 1, wherein said drying with heating is at a temperature of about 50° to about 200° C.

7. The process for producing a polyimide tube according to claim 1, wherein said heat-shrinkable polyimide film is a polyimide film stretched in at least the monoaxial direction to a stretching ratio of about 1.05 to about 5 times.

* * * * *